United States Patent
Bottner et al.

(10) Patent No.: US 9,529,487 B1
(45) Date of Patent: Dec. 27, 2016

(54) METHOD OF PROVIDING FAST SWITCHING TO WEB APPS

(75) Inventors: Keith Bottner, Richardson, TX (US); Michael Jan Lawther, West Ryde (AU)

(73) Assignee: GOOGLE INC., Mountain View, CA (US)

( * ) Notice: Subject to any disclaimer, the term of this patent is extended or adjusted under 35 U.S.C. 154(b) by 41 days.

(21) Appl. No.: 13/347,596

(22) Filed: Jan. 10, 2012

(51) Int. Cl.
*G06F 3/00* (2006.01)
*G06F 3/0481* (2013.01)
*G06F 3/048* (2013.01)

(52) U.S. Cl.
CPC ............. *G06F 3/0481* (2013.01); *G06F 3/048* (2013.01)

(58) Field of Classification Search
CPC ............................... G06F 3/048; G06F 3/0481
USPC ........................................ 715/779, 738–739
See application file for complete search history.

(56) References Cited

U.S. PATENT DOCUMENTS

| | | | | |
|---|---|---|---|---|
| 2001/0035882 A1* | 11/2001 | Stoakley | ............... | G06F 3/0481 715/779 |
| 2006/0230356 A1* | 10/2006 | Sauve | .................. | G06F 3/0481 715/777 |
| 2008/0005686 A1* | 1/2008 | Singh | .................... | G06F 3/0483 715/764 |
| 2008/0109753 A1* | 5/2008 | Karstens | ........................ | 715/802 |
| 2011/0022971 A1* | 1/2011 | Epling et al. | .................. | 715/760 |
| 2011/0066977 A1* | 3/2011 | DeLuca et al. | ............... | 715/811 |
| 2011/0145744 A1* | 6/2011 | Haynes | ................. | G06F 3/0481 715/766 |
| 2011/0252381 A1* | 10/2011 | Chaudhri | ....................... | 715/838 |
| 2011/0307810 A1* | 12/2011 | Hilerio | .................. | G06F 3/0481 715/760 |
| 2011/0307812 A1* | 12/2011 | Hilerio et al. | ................ | 715/760 |
| 2011/0314389 A1* | 12/2011 | Meredith | .................. | G06F 8/60 715/751 |
| 2012/0066630 A1* | 3/2012 | Kim et al. | ..................... | 715/769 |
| 2012/0174020 A1* | 7/2012 | Bell et al. | ...................... | 715/779 |
| 2013/0031490 A1* | 1/2013 | Joo et al. | ....................... | 715/760 |
| 2013/0111415 A1* | 5/2013 | Newman et al. | ............. | 715/864 |
| 2013/0263021 A1* | 10/2013 | Dunn | .................. | H04L 12/1827 715/756 |

* cited by examiner

*Primary Examiner* — Kieu Vu
*Assistant Examiner* — Andrew Chung
(74) *Attorney, Agent, or Firm* — McDermott Will & Emery LLP (57) ABSTRACT

Methods, systems, and apparatuses, including computer programs encoded on a computer storage medium, for providing fast switching to web applications are disclosed. In one method embodiment, a browser application may be determined to be operating on a computing device, the browser application including one or more tabs wherein one of the tabs is associated with a web application. The method may further include the actions of determining that the computing device includes a fast-switch list including one or more applications operating on the computing device, and adding the web application to the fast-switch list.

19 Claims, 6 Drawing Sheets

METHOD OF PROVIDING FAST SWITCHING TO WEB APPS

BACKGROUND

Fast switching is the process by which applications running on an operating system may be quickly navigated to by a user. For example, on a typical computer, a user may have open multiple applications, such as, a word processing application, a spreadsheet application, and a multi-media application. To navigate between the different applications operating on the computer, a user would have to use his or her mouse to select which application the user desires to use or access. Using a fast-switch list, by contrast, would allow the user to enter a keystroke on a keyboard of the computer that would quickly navigate among the various open applications. A fast-switch list, however, only includes those applications that are opened or operating directly on the local computer or operating system.

BRIEF SUMMARY

In general, one embodiment the subject matter described herein may be a method that includes the action of determining that a browser application is operating on a computing device, the browser application including one or more tabs wherein one of the tabs is associated with a web application. The method may further include the actions of determining that the computing device includes a fast-switch list including one or more applications operating on the computing device, and adding the web application to the fast-switch list.

Other embodiments may include corresponding systems, apparatus, and computer programs, configured to perform the actions of the methods, encoded on computer storage devices. Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments are described herein with reference to illustrations for particular applications. It should be understood that the embodiments are not intended to be limiting. Those skilled in the art with access to the teachings provided herein will recognize additional modifications, applications, and embodiments within the scope thereof and additional fields in which the embodiments would be of significant utility.

Fast-switching is a process that allows a user or operator of a computing device to quickly navigate between applications or programs operating on the computing device. For example, a user may have open on a computing device a word processing program and a web browser with tabs that are opened to several different websites. Using fast-switching, a user may be able to quickly navigate between the word processing program and the web browser. Expanding the capabilities of fast-switching to the tabs of the web browser, may allow a user to not only navigate between the word processing program and the web browser, but also one or more of the individual tabs or websites opened within the web browser.

Figure 1A:
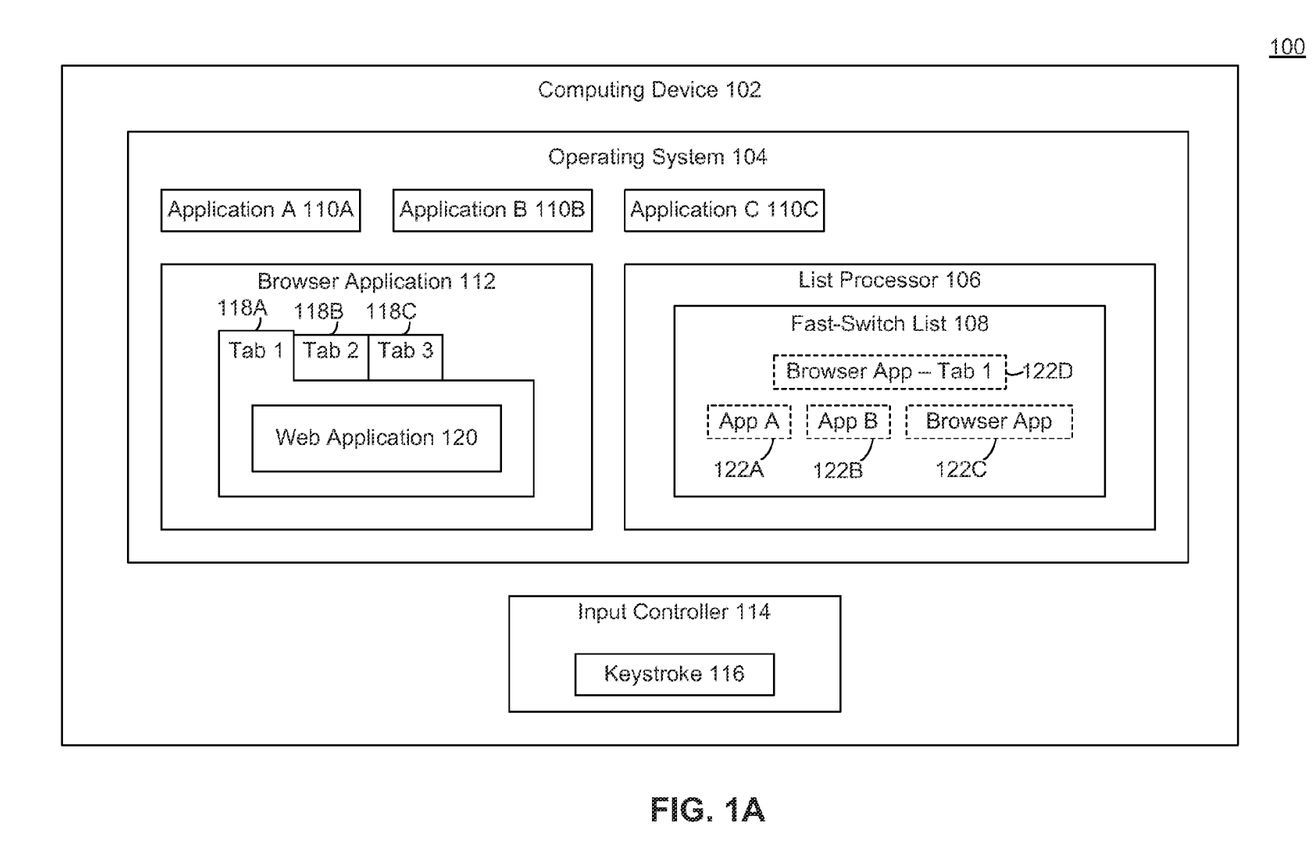
FIG. 1A is a diagram illustrating a system for providing fast switching to web applications, according to an embodiment.

FIG. 1A is a block diagram illustrating an example system for providing fast switching to web applications. System 100 includes a computing device 102 with an operating system 104. Operating system 104 may include a list processor 106 that manages a fast-switch list 108 for applications 110A, 110B, 112 operating on computing device 102.

Computing device 102 may include any electronic computing device. For example, computing device 102 may be a computer, laptop, desktop, mobile phone, monitor, television, tablet computer, or other computing device. Computing device 102 may include one or more processors.

Operating system 104 may include a set of one or more programs that manage computer hardware resources and provide common services to applications 110 and 112. For example, operating system 104 may provide input, output and memory allocation services for applications 110, 112 operating on operating system 104. In an embodiment, operating system 104 may perform time-share operations and scheduling operations that allow applications 110, 112 to share resources and/or allow a user to open, operate and activate instances of multiple applications simultaneously.

Computing device 102 may include an input controller 114 that receives one or more keystrokes 116 from a user. Input controller 114 may include any input or input/output controller. Input controller 114 may detect input from a user, such a keystroke 116 from a keyboard or other input device connected to computing device 102. For example, computing device may be wirelessly coupled to a keyboard or other input device. When the user enters a keystroke 116 on the keyboard, input controller 114 may detect the input and provide an interrupt to operating system 104 to register or handle the keystroke 116.

Keystroke 116 may be any input provided to computing device 102 through any input device. For example, as just referenced, keystroke 116 may be a pressing of one or more keys on a keyboard connected to computing device 102. In other embodiments, keystroke 116 may include a movement of a mouse or a finger swipe on a touchscreen of computing device 102. As used herein, keystroke 116 is input as received from an input device that activates a fast-switch list 108. For example, keystroke 116 may cause operating system 104 to navigate or toggle between the applications included on fast-switch list 108.

Applications 110 may include any applications or programs executable on operating system 104. For example, applications 110 may include word processing, spreadsheet, drawing, database, games or other applications. In an embodiment, applications 110 may be stored or operated locally on computing device 102. A user may then open or activate an application 110 that may cause operating system 104 to activate an instance of the application 110 on operating system 104. List processor 106 may then add an identifier 122 corresponding to the activated or opened application 110 to fast-switch list 108.

Identifier 122 may be a reference to an opened application 110, 112 that is included on fast-switch list 108. Identifier 122, as described in further detail below, may be an icon that is visible to users. In an embodiment, a user may activate and a view fast-switch list 108, that may include identifiers 122 corresponding to the applications 110, 112 included in fast-switch list 108. In another embodiment, identifiers 122 may only be internal references to applications 110, 112 included on fast-switch list 108 that may not be visible to a user. When keystroke 116 is detected, list processor 106 may use identifiers 122 to toggle or navigate between the open applications 110, 112 as included on fast-switch list 108.

List processor 106 may be a component, application or process operating on or in conjunction with operating system 104 that manages fast-switch list 108. Fast-switch list 108 may be a utility or feature of operating system 104 that allows a user to quickly navigate amongst the applications of fast-switch list 108 by entering keystroke 116. For example, a user may be typing a report on a word processing application (e.g., application 110A) and may simultaneously have open a spreadsheet application (e.g., application 110B) running on a background process of operating system 104 with sales figures and charts. The user may then enter keystroke 116 to switch between the currently active word processing application 110B, and the spreadsheet application 110B. List processor 106 may then to activate the spreadsheet application 110B on operating system 104, and application 110A may begin operating on a background process of operating system 104. List processor 106 may allow a user to toggle or navigate between opened applications operating on operating system 104 by entering keystroke 116.

Browser application 112 may be an application or program similar to that described above with reference to application 110. Application 112 may include an additional feature allowing multiple windows or tabs 118 for accessing to various documents or sub-applications within application 112. Tab 118 may be a navigational widget that allows a single instance of browser application 112 to have opened within it multiple documents.

In an embodiment, browser application 112 may be a web browser used to access the Internet or other networks, which may include multiple tabs 118A-C. Each tab 118 may be directed to a webpage or other web application 120. Web application 120 may be any webpage, website, or other document or set of documents that may be opened within or accessible via browser application 112. Though browser application 112 is primarily described herein as being a web browser application, one skilled in the art will recognize other embodiments may include any application or program that allows a user to access multiple documents within a since instance of the browser application 112. For example, in another embodiment browser application 112 may be a word processing application, with multiple windows or tabs 118 corresponding to different word processing documents (e.g., web applications 120).

In contrast to conventional fast-switch lists, list processor 106 may add identifiers 122 or instances of tabs 118A-C corresponding to web applications 120 to fast-switch list 108. For example, if a user has activated instances of application 110A, application 110B and browser application 112 with tabs 118A-C, a conventional fast-switch list will only include instances of application 110A, application 110B and browser application 112. List processor 106 however may also include identifiers 122 for one or more of tabs 118A-C. Application 110C, as shown, may be an application that exists on operating system 104, which a user has not activated or opened and thus is not included on a conventional fast-switch list or fast-switch list 108.

In the example of FIG. 1, fast-switch list 108 may include identifiers 122C and 122D corresponding to separately accessible instances of browser application 112 and tab 118A of browser application 112. When identifier 122C is selected or activated from fast-switch list 108, operating system 104 may activate browser application 112 with whatever the most recently active tab 118A-C was being opened. If however, identifier 122D is selected, operating system 104 may activate web application 120 of tab 118A on browser application 112, regardless of what the most recently active tab 118A-C was on browser application 112. This may allow a user to directly navigate to activate web application 120, rather than having to first activate browser application 112 and then manually select tab 118A for web application 120.

Though fast-switch list 108 only include two identifiers 122C and 122D corresponding to browser application 112 and tab 118A of browser application 112, other embodiments may include identifiers for each of tabs 118A-C. In another embodiment, fast-switch list 108 may include multiple identifiers 122 from multiple different types of browser applications 112. For example, fast-switch list 108 may include independent identifiers 122 for various documents opened in a word processing application, as well as independent identifiers 122 for various websites opened in a web browser.

List processor 106 may determine which tabs 118A-C to include on fast-switch list 108 based on any number of factors. In an embodiment, list processor 106 may add a tab 118 to fast-switch list 108 based upon a selection by a user. For example, a user may enter a particular keystroke 116 or select a menu item from browser application 112 requesting to add web application 120 corresponding to tab 118A to fast-switch list 108. As another example, list processor 106 may automatically add each browser tab 118 to fast-switch list 108.

In another embodiment, list processor 106 may add web application 120 to fast-switch list 108 based upon a frequency of use or operation of web application 120. For example, if a user uses or has open web application 120 for more than a specified time interval, or if a user activates browser application 112 and selects tab 118A more than specified number of times, then list processor 106 may determine that web application 120 is frequently used and may automatically (e.g., without a specific user request) add web application 120 from tab 118A to fast-switch list 108.

In another embodiment, list processor 106 may add web application 120 to fast-switch list 108 based upon a user selection of a pre-existing menu item from browser application 112. For example, browser application 112 may be a web browser that allows a user to pin particular tabs to browser application 112.

Figure 1B:
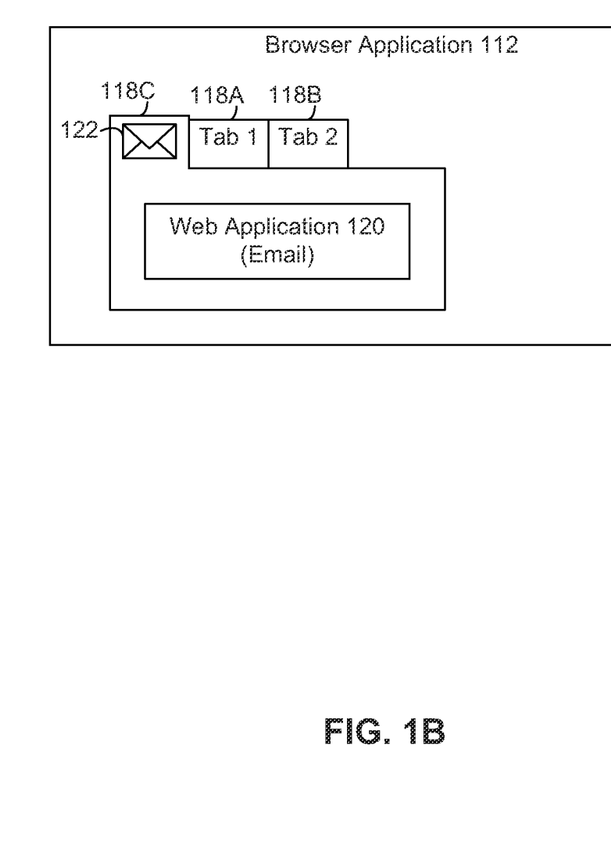
FIG. 1B is a diagram illustrating an example browser application after receipt of a request to pin a tab.

FIG. 1B is a diagram illustrating an example browser application 112 after receipt of a request to pin a tab. A user may request to pin a tab 118 of browser application 112 when the tab 118 is opened to a web application 120 that the user anticipates he/she will frequently be accessing. The pin feature may allow browser application 112 to save valuable screen real estate by shrinking the name field of a tab 118 down to an identifier 122 associated with the corresponding web application 120 of the selected or identified tab 118 to be pinned. For example, web application 120 of tab 118C may be an e-mail application. The pin feature may also move all the pinned tabs to a known portion of browser so that the user knows where the pinned tabs are located and more quickly locate and select the tab 118 that the user desires. When a pin-request is submitted by a user to pin tab 118C to browser application 112, tab 118C may be modified to display identifier 122 associated with web application 120.

Identifier 122 may be any visual identifier associated with or corresponding to a web application 120. For example, the publisher of a website may select a particular image and/or text as identifier 122 for the website. Then, for example, the selected identifier 122 may be used as part of the pin-tab feature of browser application 112 when a tab 118 that has the web application 120 (e.g., website) opened is pinned. As referenced above, and as shown in FIG. 1C, identifier 122 may also be used to identify the web application 120 when it is added to fast-switch list 108.

As shown in FIG. 1B, pinned tabs (e.g., tab 118C) may be grouped together on a particular portion of browser application 112. For example, when a tab 118 is pinned, the pinned tab may be moved to a pinned tab section of browser application 112, such as the left-most side. A user however may be able to reorder or reorganize the relative locations of the tabs 118A-C, including the pinned tabs (e.g., 118C) about the opened tabs of browser application 118.

In one embodiment, list processor 106 may add web application 120 corresponding to a selected pinned tab 118C to fast-switch list 108 upon a determination that the tab 118C has been pinned or otherwise upon a request to pin tab 118C. List processor 106 may interpret a pin-request as being an indication that the user is interested in or likely to access the particular web application 120 frequently, and may automatically (e.g., without an additional or subsequent request from the user) add the web application 120 to fast-switch list 108.

Figure 1C:
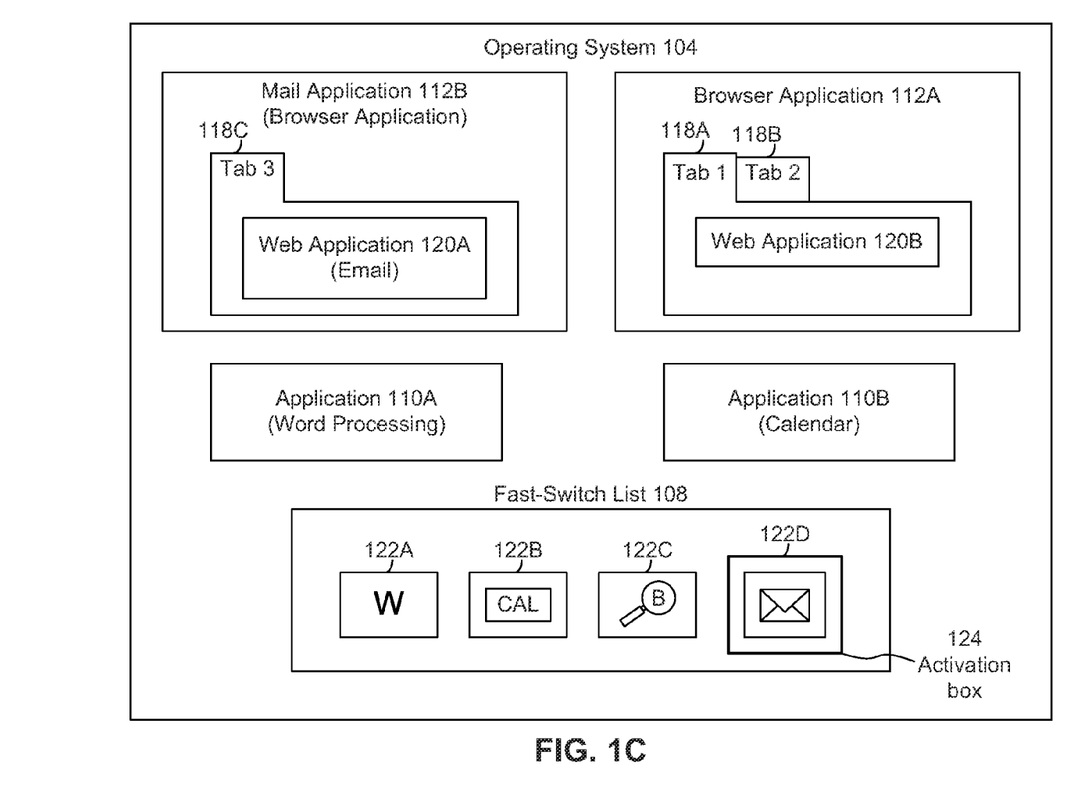
FIG. 1C is a diagram illustrating the addition of a web application to a fast-switch list, according to an embodiment.

FIG. 1C is a diagram illustrating the addition of a web application to a fast-switch list, according to an embodiment. As shown in the example embodiment of FIG. 1C, operating system 104 may, upon adding tab 118C to fast switch list 108, separate browser application 112 into separate instances 112A and 112B. For example, instance 112B may include tab 118C as selected for inclusion on fast-switch list 108. Instance 112A may include the remaining tabs 118A and 118B that do not have their own identifiers 122 or are otherwise are not separately accessible directly from fast-switch list 108. In one embodiment, operating system 104 may instantiate a new instance 112B of browser application 112 and load web application 120A in a new tab 118C of instance 112B, or may move tab 118C from instance 112A to instance 112B.

In an embodiment, fast-switch list 108 may be visible to a user, and may allow a user to select from fast-switch list 108 which application 110, 112 to activate based on identifiers 122 corresponding to the included applications 110, 112. For example, as shown, identifier 122A may correspond to application 110A, identifier 122B may correspond to application 110B, identifier 122C may correspond to browser application 112A, and identifier 122D may correspond to browser application 112B or more particular tab 118C. Fast-switch list 108 may also include an activation box 124 indicating which application 110, 112 is currently active on operating system 104.

Activation box 124 may be a highlight, box, or other visual indication or visual indicator that indicates which application 110, 112 is currently active on operating system 104. In an embodiment, keystroke 116 may (e.g., such as a mouse movement) allow a user to use activation box 112 to select the identifier 122 corresponding to the application 110, 112 user wants to activate. In the example shown, the currently active application is web application 120A. A user however may also select amongst any of the opened word processing application 110A, the calendar application 110B or the browser application 112A as indicated by the corresponding identifiers 122A, 122B and 122C.

Returning to FIG. 1A, in an embodiment, upon a restart of computing device 102, operating system 104, or browser application 112, list processor 106 may automatically add tabs 118A-C corresponding to web applications 120 to fast-switch list 108. List processor 106 may track and automatically add web applications 120 that may have previously been added to fast-switch list 108 to fast-switch list 108 upon a restart of system 100. For example, if browser application 112 is restarted, and upon restart web application 120 of tab 118A is opened in a new tab 118, list processor 106 may then automatically add web application 120 in its new tab 118 to fast-switch list 108.

List processor 106 may also remove identifiers 122 from fast-switch list 108 when the corresponding applications 110, 112 are closed. For example, if tab 118 is closed in browser application 112, list processor 106 may remove identifier 122D from fast-switch list 108. If however, browser application 112 (including tabs 118A-C) is closed, list processor 106 may remove both identifier 112C and 122D from fast-switch list 108. If later, browser application 112 is restarted and web application 120 is opened in a new tab 118, list processor may then include identifiers 122C and 122D corresponding to browser application 112 and the tab 118 with web application 120, respectively.

In other embodiments, the automatic add feature of list processor 106 as pertaining to automatically adding previously added web applications 120 to fast-switch list 108 may be disabled. List processor 106 may then, for example, wait for a request from a user (or other indication as described above) to add a web application 120 to fast-switch list 108.

Figure 2:
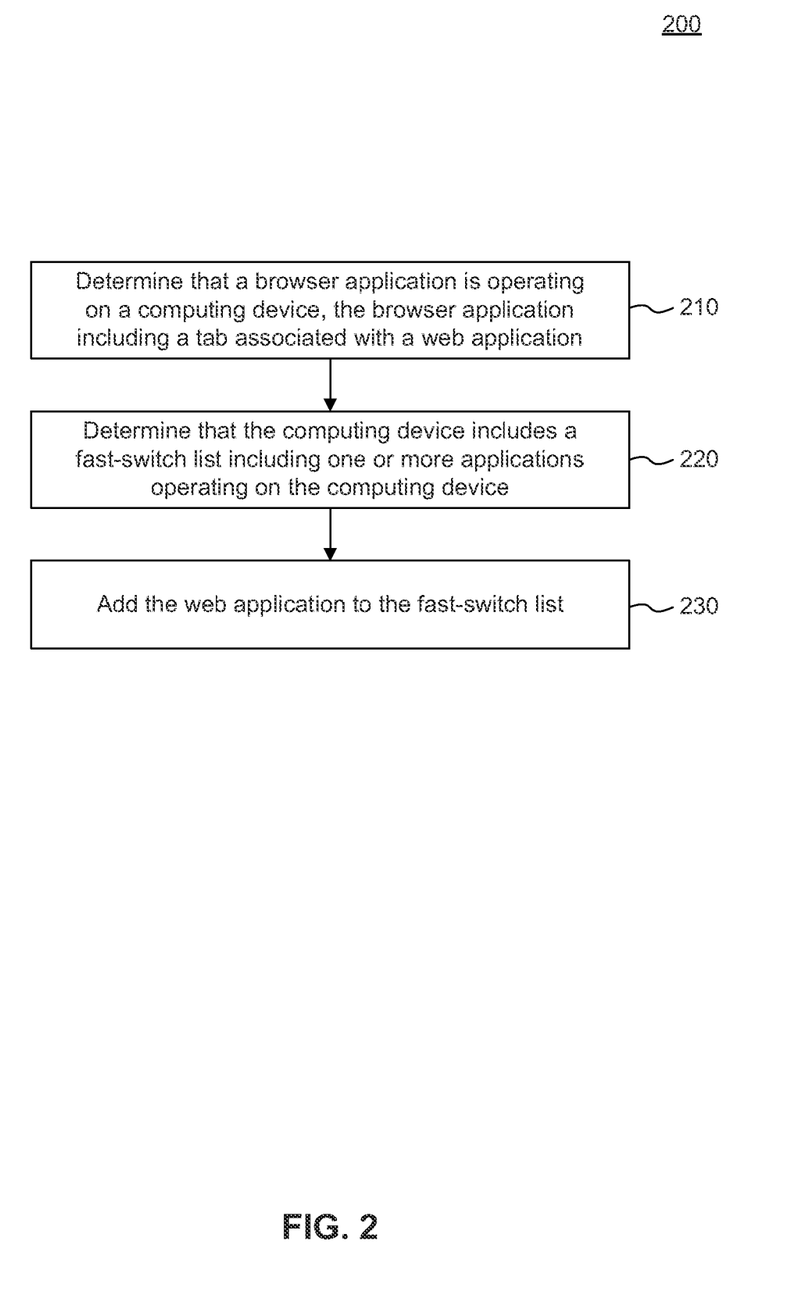
FIG. 2 is a flowchart of an example method for providing fast switching to web applications.

FIG. 2 is a flowchart of a method for providing fast switching to web applications, according to an embodiment.

At stage 210, it is determined that a browser application is operating on a computing device, the browser application including a tab associated with a web application. For example, list processor 106 may determine when an instance of browser application 112 is opened and operating on operating system 104. Browser application 112 may then allow a user to open one or more tabs 118 for viewing or accessing different web applications 120 or other documents.

At stage 220, it is determined that the computing device includes a fast-switch list including one or more applications operating on the computing device. For example, operating system 104 may determine that computing device 102 includes fast-switch list 108. List processor 106 may manage fast-switch list 108 and may add applications 110, 112 to fast-switch list 108 when instances of the applications 110, 112 are initiated on operating system 104. List processor 106 may add various identifiers 122 to fast-switch list 108 corresponding to opened applications 110, 112.

At stage 230, the web application is added to the fast-switch list. For example, list processor 106 may receive an indication (such as a pin-request) from a user to add a particular web application 120 as opened within a tab 118 of browser application 112 to fast-switch list 108. List processor 106 may then add an identifier 122 corresponding to web application 120 (as opened within a tab 118 of browser application 112) to fast-switch list 108. Fast-switch list 108 may then include two or more identifiers 122 corresponding to a single browser application 112, by which the individually selected web application 120 may is independently selectable from fast-switch list 108.

Figure 3:
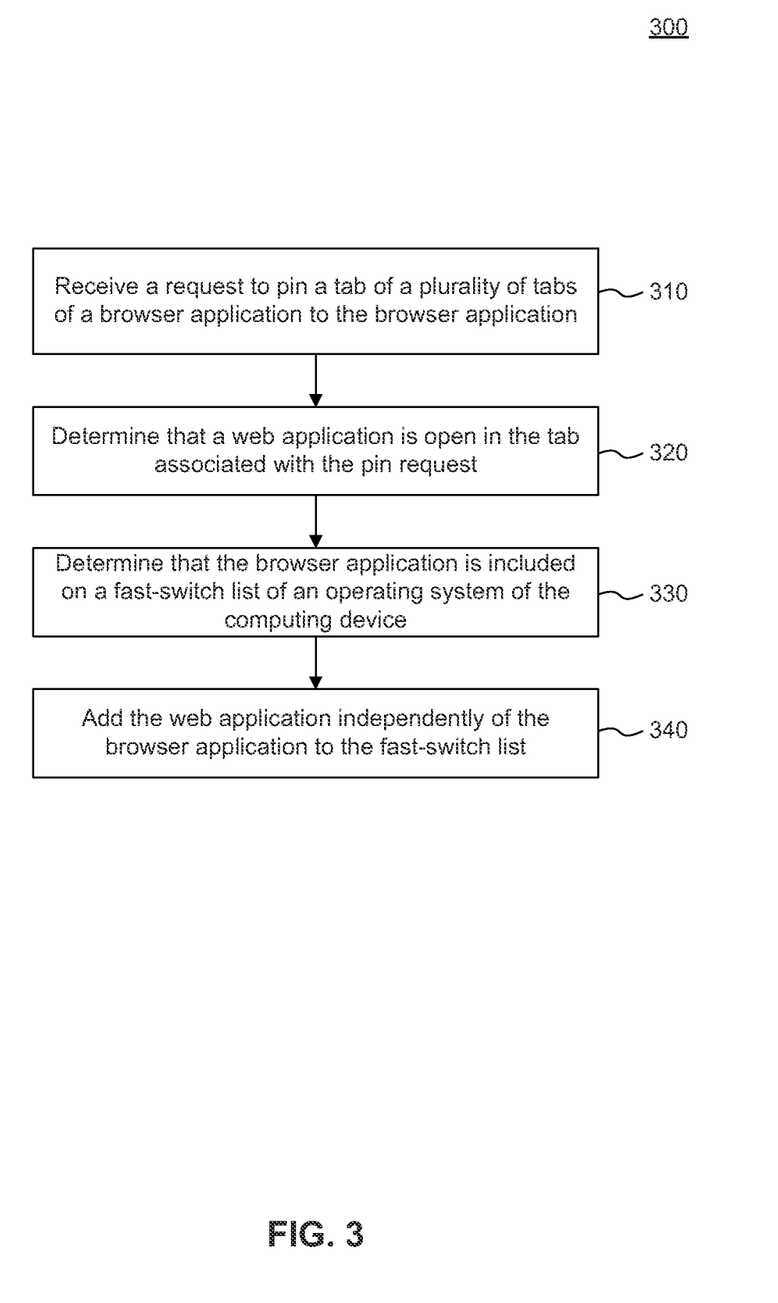
FIG. 3 is another flowchart of an example method for providing fast switching to web applications.

FIG. 3 is another flowchart of a method for providing fast switching to web applications, according to an embodiment.

At stage 310, a request to pin a tab of a plurality of tabs of a browser application to the browser application is received. Browser application 112 may include a pin feature that arranges pinned tabs 118 within a particular location on browser application 112, as shown in FIG. 1B. For example, a user may request to pin a tab 118C of browser application 112. Browser application 112 may then replace the name field of tab 118C with an identifier 122 corresponding to the web application 120 of tab 118C. List processor 106 may detect or receive the pin-request and may correspondingly add the web application 120 to fast-switch list 108. In an embodiment, list processor 106 functionality may be integrated into the existing functionality of browser application 112 and may not require user to take any additional steps to request the addition of a web application 120 to fast-switch list 108.

At stage 320, it is determined that a web application is open in the tab associated with the pin request. For example, a user may enter a website or other network address into an address bar corresponding to a tab 118 of browser interface 112. A request to pin the tab 118 may be received by browser application 112, which may proceed to pin the tab 118 as described above. Operating system 104 may also receive notice of the pin-request and provide the pin-request to list processor 106. List processor 106 may then determine which web application 120 is opened within tab 118C corresponding to the pin-request.

At stage 330, it is determined that the browser application is included on a fast-switch list of an operating system of the computing device. For example, list processor 106 may determine that browser application 112 is included on fast-switch list 108 of operating system 104. List processor 106 may add applications 110, including browser application 112, to fast-switch list 108 upon an instantiation of an instance of the application 110, 112 on operating system 104.

At stage 340, the web application is added independently of the browser application to the fast-switch list. For example, list processor 106 may add a separate identifier 122D for web application 120 of browser application 112 to fast-switch list 108. This addition may allow the web application 120 to be selected independently from the browser application 112 or other applications 110A, 110B for which instances are operating locally on operating system 104.

Figure 4:
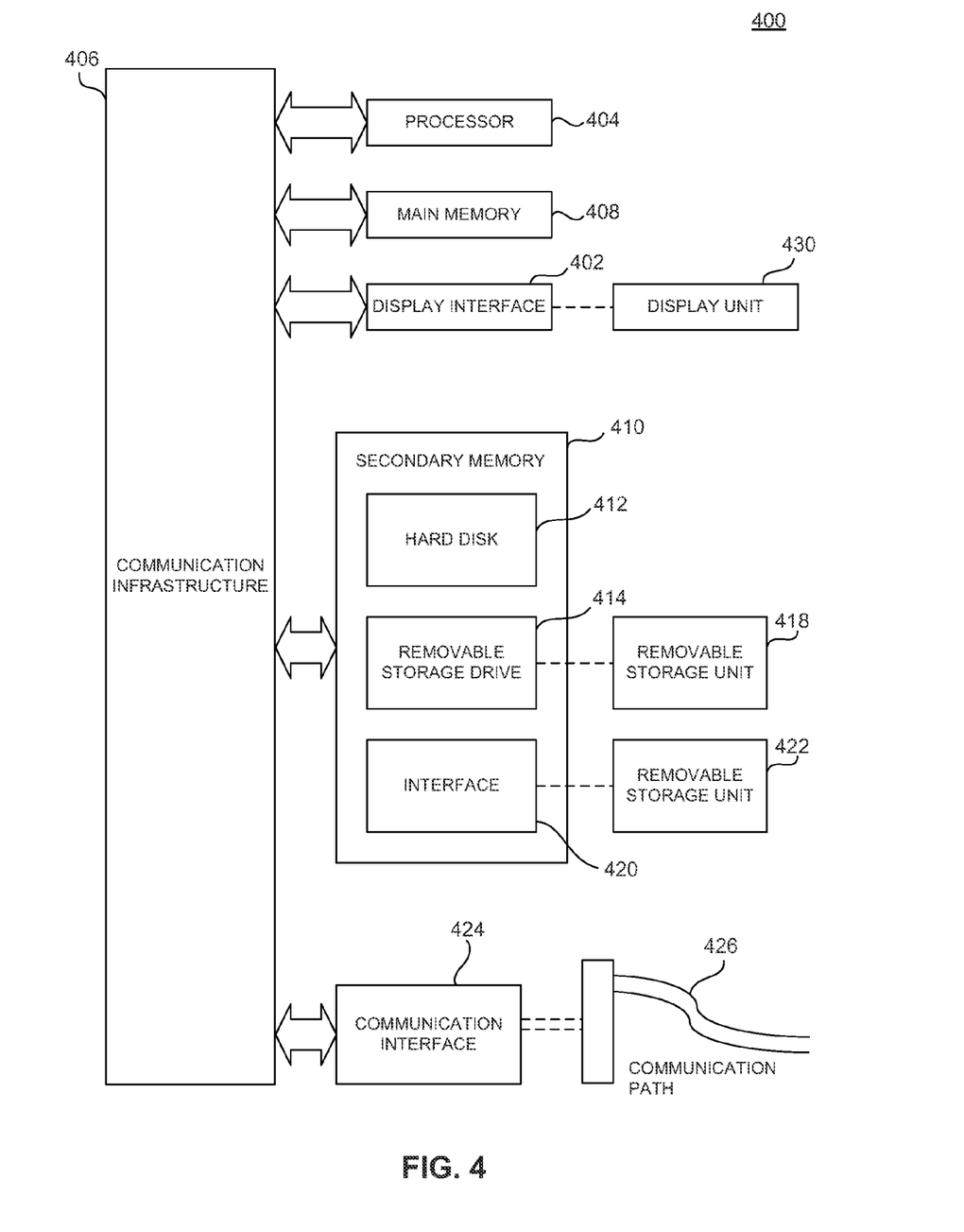
FIG. 4 is a system diagram that can be used to implement embodiments described herein.

FIG. 4 illustrates an example computer system 400 in which embodiments of as described herein, or portions thereof, may be implemented as computer-readable code. For example, system 100 may be implemented in computer system 400 using hardware, software, firmware, tangible computer readable media having instructions stored thereon, or a combination thereof and may be implemented in one or more computer systems or other processing systems. Hardware, software, or any combination of such may embody any of the modules, procedures and components in FIGS. 1-3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 400. After reading this description, it will become apparent to a person skilled in the relevant art how to implement the embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose or a general-purpose processor device. As will be appreciated by persons skilled in the relevant art, processor device 404 may also be a single processor in a multi-core/multiprocessor system, such system operating alone, or in a cluster of computing devices operating in a cluster or server farm. Processor device 404 is connected to a communication infrastructure 406, for example, a bus, message queue, network, or multi-core message-passing scheme.

Computer system 400 also includes a main memory 408, for example, random access memory (RAM), and may also include a secondary memory 410. Secondary memory 410 may include, for example, a hard disk drive 412, removable storage drive 414. Removable storage drive 414 may comprise a floppy disk drive, a magnetic tape drive, an optical disk drive, a flash memory, or the like. The removable storage drive 414 reads from and/or writes to a removable storage unit 418 in a well-known manner. Removable storage unit 418 may comprise a floppy disk, magnetic tape, optical disk, etc. which is read by and written to by removable storage drive 414. As will be appreciated by persons skilled in the relevant art, removable storage unit 418 includes a computer usable storage medium having stored therein computer software and/or data.

In alternative embodiments, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like.

In this document, the terms "computer program medium" and "computer usable medium" are used to generally refer to media such as removable storage unit 418, removable storage unit 422, and a hard disk installed in hard disk drive 412. Computer program medium and computer usable medium may also refer to memories, such as main memory 408 and secondary memory 410, which may be memory semiconductors (e.g. DRAMs, etc.).

Computer programs (also called computer control logic) are stored in main memory 408 and/or secondary memory 410. Computer programs may also be received via communications interface 424. Such computer programs, when executed, enable computer system 400 to implement the present embodiments as discussed herein. In particular, the computer programs, when executed, enable processor device 404 to implement the processes as illustrated by the flowcharts of FIGS. 3 and 4 discussed above. Accordingly, such computer programs represent controllers of the computer system 400. Where an embodiment is implemented using software, the software may be stored in a computer program product and loaded into computer system 400 using removable storage drive 414, interface 420, and hard disk drive 412, or communications interface 424.

Embodiments may also be directed to computer program products comprising software stored on any computer useable medium. Such software, when executed in one or more data processing device, causes a data processing device(s) to operate as described herein. Embodiments may employ any computer useable or readable medium. Examples of computer useable mediums include, but are not limited to, primary storage devices (e.g., any type of random access memory), secondary storage devices (e.g., hard drives, floppy disks, CD ROMS. ZIP disks, tapes, magnetic storage devices, and optical storage devices, MEMS, nanotechnological storage device, etc.).

The embodiments have been described above with the aid of functional building blocks illustrating the embodiment of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments allows others, by applying knowledge within the skill of the art, readily modify and/or adapt for various applications such specific embodiments, without undue experimentation, without departing from the general concept of what has been described herein. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A computer-implemented method comprising:
    determining that a browser application is operating on a computing device, the browser application comprising a plurality of tabs, wherein a first web application operates in a first tab of the tabs, and a second web application operates in a second tab of the tabs;
    determining that the computing device includes a fast-switch list of an operating system that exclusively includes one or more applications currently operating on the computing device including a visual identifier corresponding to the browser application, wherein the fast-switch list includes a designation of one of the applications as being an active application on the computing device, and
    wherein the active application on the computing device is selectable from the one or more applications of the fast-switch list upon a detection of a keystroke that changes the designation of the active application to a selected one of the applications; and
    adding a visual identifier associated with the first web application to the fast-switch list of the operating system responsive to detecting a request received through the browser application to pin the first tab of the tabs associated with the first web application, a name field of the pinned first tab of the tabs being replaced with an identifier corresponding to the first web application, wherein after the adding the fast-switch list includes at least two visually distinct visual identifiers both corresponding to the browser application, the at least two visually distinct visual identifiers including the visual identifier associated with the first web application, wherein the visual distinction distinguishes the browser application from the first web application operating within the first tab of the browser application, wherein the first web application continues to operate in the first tab subsequent to the adding of the first web application to the fast-switch list,
    wherein a selection of the visual identifier corresponding to the first web application designates the first tab of the browser application as the active application in the fast-switch list, and
    wherein a selection of the visual identifier corresponding to the browser application designates a most-recently active tab of the browser application as the active application, wherein the second tab corresponding to the second web application is the most recently active tab of the browser application.

2. The computer-implemented method of claim 1, wherein the adding comprises:
    rendering the fast-switch list on a screen of the computing device, wherein the rendering includes adding an identifier representing the first web application to the fast-switch list, wherein the fast-switch list already included the visual identifier corresponding to the browser application, and at least one other visual identifier corresponding to one of the applications operating on the computing device.

3. The computer-implemented method of claim 1, wherein the identifier corresponding to the first web application comprises an icon representing the first web application, and wherein the icon distinguishes the first web application from the browser application in the fast-switch list.

4. The computer-implemented method of claim 1, wherein the adding comprises:
    receiving an indication to add the first web application to the fast-switch list, the indication including a selection of an option from the browser application.

5. The computer-implemented method of claim 1, further comprising:
    determining that the first web application is no longer operating on the browser application;
    determining that the first web application is removed from the fast-switch list;

detecting that the first web application has been restarted in a new tab of the browser application; and adding the first web application to the fast-switch list responsive to the detecting.

6. The computer-implemented method of claim 5, wherein the determining that the first web application is no longer operating on the browser application comprises:

determining that the browser application is no longer operating on the operating system; and determining that the browser application and the first web application are removed from the fast-switch list.

7. The computer-implemented method of claim 1, wherein the determining that the computing device includes the fast-switch list comprises:

determining that the fast-switch list is associated with the operating system of the computing device, wherein the one or more applications include one or more applications operating on the operating system independently of the browser application.

8. The computer-implemented method of claim 1, wherein the keystroke comprises an input on a touchpad of the computing device.

9. The computer-implemented method of claim 1, wherein the keystroke comprises an input on a touch screen of the computing device.

10. The computer-implemented method of claim 1, wherein the browser application includes the plurality of tabs, wherein the second web application has its own unique visual identifier on the fast-switch list corresponding to the second tab.

11. The computer-implemented method of claim 10, wherein the unique visual identifier corresponding to the second web application is distinct from both the visual identifier corresponding to first web application and the visual identifier corresponding to the browser application.

12. The computer-implemented method of claim 1, wherein the selection of the visual identifier corresponding to the browser application activates the browser application including both the first and second tabs, wherein the second tab is the most-recently active tab.

13. The computer-implemented method of claim 1, wherein the browser application includes one or more additional tabs for which visual identifiers are not in the fast-switch list.

14. A system comprising:

a computing device including at least one processor;

one or more applications operating on an operating system of the computing device, including one of the applications being designated as an active application on the operating system, wherein the one or more applications include a browser application and the browser application comprises a plurality of tabs;

a first web application associated with a first tab of the browser application;

a second web application associated with a second tab of the browser application;

a fast-switch list of the operating system configured to allow a user to select the active application on the operating system from amongst the one or more applications with a keystroke received by the computing device, wherein the fast-switch list exclusively includes the one or more applications currently operating on the computing device including a visual identifier corresponding to the browser application, and the fast-switch list includes a designation of the active application on the computing device;

an input controller configured to determine an occurrence of the keystroke; and a list processor configured to add a visual identifier associated with the first web application to the fast-switch list of the operating system responsive to detecting a request to pin the first tab received within the browser application, wherein a name field of the pinned first on of the tabs is replaced with an identifier corresponding to the first web application, wherein after the add the fast-switch list includes at least two visually distinct visual identifiers both corresponding to the browser application, the at least two visually distinct visual identifiers including the visual identifier associated with the first web application, wherein the visual distinction distinguishes the browser application from the first web application operating within the first tab of the browser application, and wherein the first web application continues to operate in the first tab subsequent to the adding of the first web application to the fast-switch list, wherein a selection of the visual identifier corresponding to the first web application designates the first tab of the browser application as the active application in the fast-switch list, and wherein a selection of the visual identifier corresponding to the browser application designates a most-recently active tab of the browser application as the active application, wherein the second tab corresponding to the second web application is the most-recently active tab of the browser application.

15. The system of claim 14, wherein the list processor is configured to provide a rendering of the fast-switch list on the computing device, the rendering including an identifier representing each of the applications added to the fast-switch list, including the first web application and the browser application.

16. The system of claim 14, wherein the list processor is configured to add the first web application to the fast-switch list upon a restart of the browser application, wherein the browser application is configured to restart the first web application in a new tab of the browser application.

17. The system of claim 16, wherein the list processor is configured to add the first web application to the fast-switch list upon the restart of the first web application, based upon a determination that first web application was added to the fast-switch list prior to the restart.

18. The system of claim 14, wherein the browser application includes the plurality of tabs, including the first tab associated with the first web application, and wherein the operating system is configured to activate a new instance of the browser application including the first tab associated with the first web application, upon a determination that the fast-switch list includes the first web application.

19. A non-transitory memory comprising a computer program product implemented thereon, the memory being accessible to one or more processors, the memory comprising code that when executed cause the one or more processors to:

determine that a browser application is operating on the one or more processors, the browser application comprising a plurality of tabs, wherein a first web application operates in a first tab of the plurality of tabs, and a second web application operates in a second tab of the plurality of tabs;

receive, by the browser application, a request to pin the first tab of the plurality of tabs to the browser application, wherein the first web application is open in the first tab associated with the request to pin;

pin, by the browser application, the first tab of the plurality of tabs to the browser application, wherein the pinning includes replacing a name field of the first tab with an identifier associated with the first web application;

determine that the browser application is included on a fast-switch list of an operating system, wherein the fast-switch list exclusively includes one or more applications currently operating on the one or more processors including a visual identifier corresponding to the browser application and the fast-switch list includes the browser application designated as an active application amongst the one or more applications operating on the operating system, wherein the active application on the one or more processors is selectable from the one or more applications of the fast-switch list upon a detection of a keystroke that changes a designation of the active application to a selected one of the applications; and add a visual identifier associated with the first web application to the fast-switch list of the operating system responsive to receiving, by the browser application, the request to pin the first tab to the browser application, wherein after the adding the fast-switch list includes at least two visually distinct visual identifiers both corresponding to the browser application, the at least two visually distinct visual identifiers including the visual identifier associated with the first web application, wherein the visual distinction distinguishes the browser application from the first web application operating within the first tab of the browser application, wherein the first web application continues to operate in the first tab subsequent to the adding of the first web application to the fast-switch list, wherein a selection of the visual identifier corresponding to the first web application designates the first tab of the browser application as the active application in the fast-switch list, and wherein a selection of the visual identifier corresponding to the browser application designates a most-recently active tab of the browser application as the active application, wherein the second tab corresponding to the second web application is the most-recently active tab of the browser application.

\* \* \* \* \*

UNITED STATES PATENT AND TRADEMARK OFFICE
CERTIFICATE OF CORRECTION

Page 1 of 1

PATENT NO. : 9,529,487 B1
APPLICATION NO. : 13/347596
DATED : December 27, 2016
INVENTOR(S) : Keith Bottner et al.

It is certified that error appears in the above-identified patent and that said Letters Patent is hereby corrected as shown below:

In the Claims

In Column 12, Line 8:
Replace "first on of the tabs" with --first one of the tabs--.

Signed and Sealed this
Fifth Day of November, 2019

Andrei Iancu
*Director of the United States Patent and Trademark Office*